US012730813B1

(12) United States Patent
Khan et al.

(10) Patent No.: US 12,730,813 B1
(45) Date of Patent: Sep. 8, 2026

(54) SYSTEMS AND METHODS FOR DYNAMIC SEMANTIC MEMORY GRAPH-BASED QUERY AUGMENTATION FOR NATURAL LANGUAGE PROCESSING TECHNIQUES

(71) Applicant: Verizon Patent and Licensing Inc., Basking Ridge, NJ (US)

(72) Inventors: Ahmed A Khan, Plano, TX (US); Mohammed Alsadi, Redmond, WA (US); Rangesh Sripathi, Chennai (IN); Prasannakumar Palanisamy, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/208,380

(22) Filed: May 14, 2025

(51) Int. Cl.
*G06F 16/00* (2019.01)
*G06F 16/242* (2019.01)
*G06F 16/2455* (2019.01)

(52) U.S. Cl.
CPC ........ *G06F 16/2455* (2019.01); *G06F 16/243* (2019.01)

(58) Field of Classification Search
CPC .......................... G06F 16/2455; G06F 16/243
See application file for complete search history.

(56) References Cited

U.S. PATENT DOCUMENTS

| | | | | |
|---|---|---|---|---|
| 2019/0236215 | A1* | 8/2019 | Agarwal | G06F 16/9014 |
| 2021/0406291 | A1* | 12/2021 | Mazars | G06F 16/3329 |
| 2024/0267435 | A1* | 8/2024 | Wulf | G06N 5/04 |
| 2025/0291854 | A1* | 9/2025 | Ho | G06F 16/93 |

* cited by examiner

*Primary Examiner* — Paul Kim

(57) ABSTRACT

A system described herein may maintain a plurality of nodes, each associated with a respective token or intent; determine relevance between nodes; determine that a particular measure of relevance between two particular nodes is greater than a threshold; and associate the two nodes with a particular cluster based on such determination. The cluster may be associated with particular context information. The system may further receive a query; identify a particular set of tokens or intents associated with the query; identify, based on the particular set, that the query is associated with the cluster; generate an augmented query based on the received query and further based on the particular context information associated with the cluster; and output the augmented query to a Natural Language Processing ("NLP") system that generates a response based on the augmented query.

20 Claims, 7 Drawing Sheets

SYSTEMS AND METHODS FOR DYNAMIC SEMANTIC MEMORY GRAPH-BASED QUERY AUGMENTATION FOR NATURAL LANGUAGE PROCESSING TECHNIQUES

BACKGROUND

Artificial intelligence/machine learning ("AI/ML") techniques, such as Natural Language Processing ("NLP"), enable machines to interpret and generate human language. NLP techniques may make use of Large Language Models ("LLMs"), which include advanced neural network-based models designed to perform a variety of NLP tasks, such as text generation, responding to queries, text summarization, or the like. LLMs may be trained on vast amounts of text data to learn the statistical relationships between words, phrases, and sentences. Implementing LLMs may accordingly be relatively resource-intensive, such as requiring the use of large-scale cloud computing environments in order to deliver NLP services with an acceptable measure of performance. LLMs may also be limited in size or scalability, and in some situations may lose context information, such as historical information associated with one or more previous queries or responses generated by the LLM, in the course of operation.

DETAILED DESCRIPTION OF EXAMPLE EMBODIMENTS

The following detailed description refers to the accompanying drawings. The same reference numbers in different drawings may identify the same or similar elements.

Embodiments described herein provide a dynamic semantic memory graph ("DSMG"), which may be used in conjunction with NLP techniques, such as LLM techniques, in order to generate improved responses to queries, such as user-submitted natural language queries or other suitable types of inputs. As discussed herein, the DSMG may associate certain words, phrases, terms, tokens, intents, and/or other attributes of queries with context information (e.g., descriptions, labels, curated or sample responses, etc.), and relevant context information as determined based on the DSMG may be used to augment queries. The augmented queries may be provided to an NLP system, such as a system that implements an LLM or other suitable NLP techniques, in order to generate responses to such queries. Additionally, as discussed below, the DSMG may be refined over time, both to refine the association of particular words, phrases, query terms, etc. with respective context information, as well as to reflect the importance or prevalence of particular words, phrases, query terms, etc. These mechanisms, as well as other mechanisms described herein, may provide for the DSMG to provide more accurate or otherwise suitable context information with queries processed using NLP techniques, thus ultimately enhancing the quality of technical implementations of such NLP techniques (e.g., computer-based or device-based search engines, smart home digital assistants, web-based virtual support agents, or the like).

Figure 1:
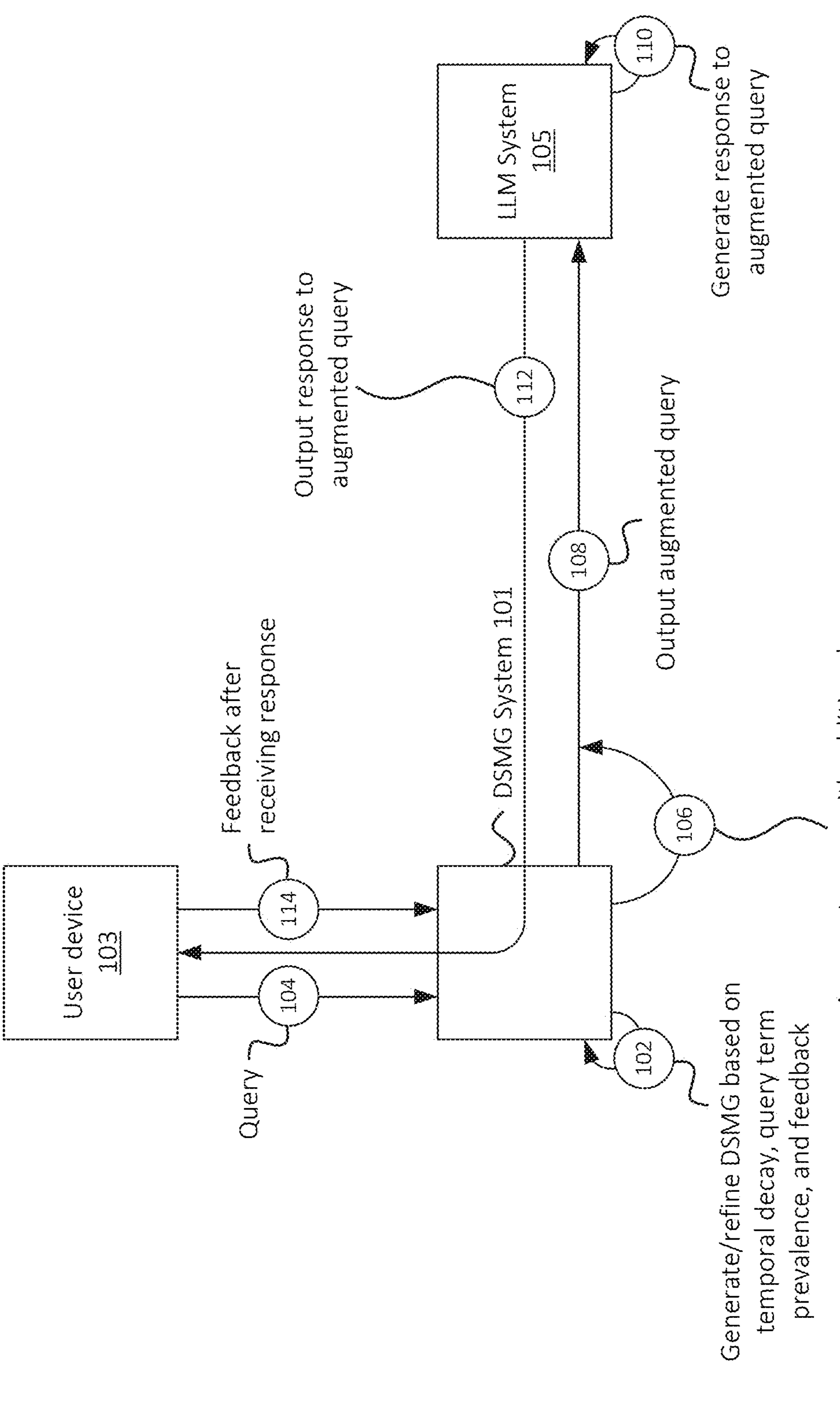
FIG. 1 illustrates an example overview of one or more embodiments described herein.

As shown in FIG. 1, for example, DSMG System 101 may generate, refine, maintain, etc. (at 102) a DSMG. As discussed in greater detail below, the DSMG may be generated, refined, etc. based on inputs (e.g., queries submitted by one or more user devices 103), outputs generated based on the inputs (e.g., responses generated by a device or system that implements one or more NLP (e.g., LLM) techniques, such as LLM System 105, and/or further feedback (e.g., user feedback, subsequent user actions, etc.) received after providing respective outputs. In some embodiments, as also described herein, refining the DSMG may include mechanisms such as a temporal decay mechanism, which may aid in pruning or managing the size of the DSMG. In this manner, the DSMG may ensure efficient use of device resources such as memory space of DSMG System 101, and may also improve the processing speed of DSMG System 101 inasmuch as a reduced size DSMG may result in faster evaluation of queries using the DSMG.

For example, DSMG System 101 may receive (at 104) an input, such as a query, from a particular user device 103. The query may include, for example, a search query, a natural language question, a prompt, a request, and/or other suitable type of input. DSMG System 101 may augment (at 106) the query with additional context information based on the DSMG. For example, as discussed below, DSMG System 101 may identify one or more contexts, categories, labels, and/or other types of information included in the DSMG. DSMG System 101 may, for example, identify words, phrases, terms, intents, etc. associated with the received query, and may identify particular contexts, categories, etc. of the DSMG that are associated with the same or similar words, phrases, terms, intents, etc. In some embodiments, identifying the same or similar words, phrases, etc. may be performed in a manner that more heavily weights words, phrases, etc. of the DSMG that have been more prevalent in past queries and/or responses, and/or that have received positive or favorable feedback (e.g., with respect to the association with a given context) in the past.

In one example, the augmented query may include some or all of the original query (received at 104), as well as additional information associated with the context, category, etc. associated with the query, as determined based on the DSMG. For example, the augmented query may include the original query, with additional context information appended, prepended, etc. to the augmented query. In some embodiments, the augmented query may include one or more delimiters or indications of the original query and/or the additional context information, such as "The original query was [the original query]," or "This query further relates to [the additional context information]."

DSMG System 101 may output (at 108) the augmented query to LLM System 105. The additional context provided as part of the augmented query may serve to further focus, refine, elaborate on, clarify, etc. the original query, and LLM System 105 may accordingly generate (at 110) a response to the augmented query (e.g., which may include evaluating both the original query as well as the additional context determined by DSMG System 101). LLM System 105 may output (at 112) the response to DSMG System 101, which may forward the response to user device 103. In this manner, user device 103 and/or a user of user device 103 may potentially receive a response that may be more relevant to the original query, by virtue of the response having been generated further based on the additional context information, than a response that is not generated based on the additional context information.

DSMG System 101 may also receive (at 114) feedback after receiving the response. The "feedback," as discussed herein, may include subsequent operations such as subsequent queries submitted by user device 103. In one example, a repeated query with the same or similar terms may indicate a relatively low measure of satisfaction or quality of the provided response. For example, a user may be dissatisfied with the response, and may attempt to submit the same query (or a similar query) using different phrasing. On the other hand, subsequent operations that are unrelated to the previous query (e.g., submitting a different query, not submitting a subsequent query within a threshold amount of time, etc.) may indicate that a user was satisfied with the response and has moved on to other tasks. In some embodiments, DSMG System 101 may further refine the DSMG based on the feedback, such as by increasing or decreasing the association of certain words, phrases, tokens, etc. with context information provided with the response and/or other types of refinements.

Figure 2:
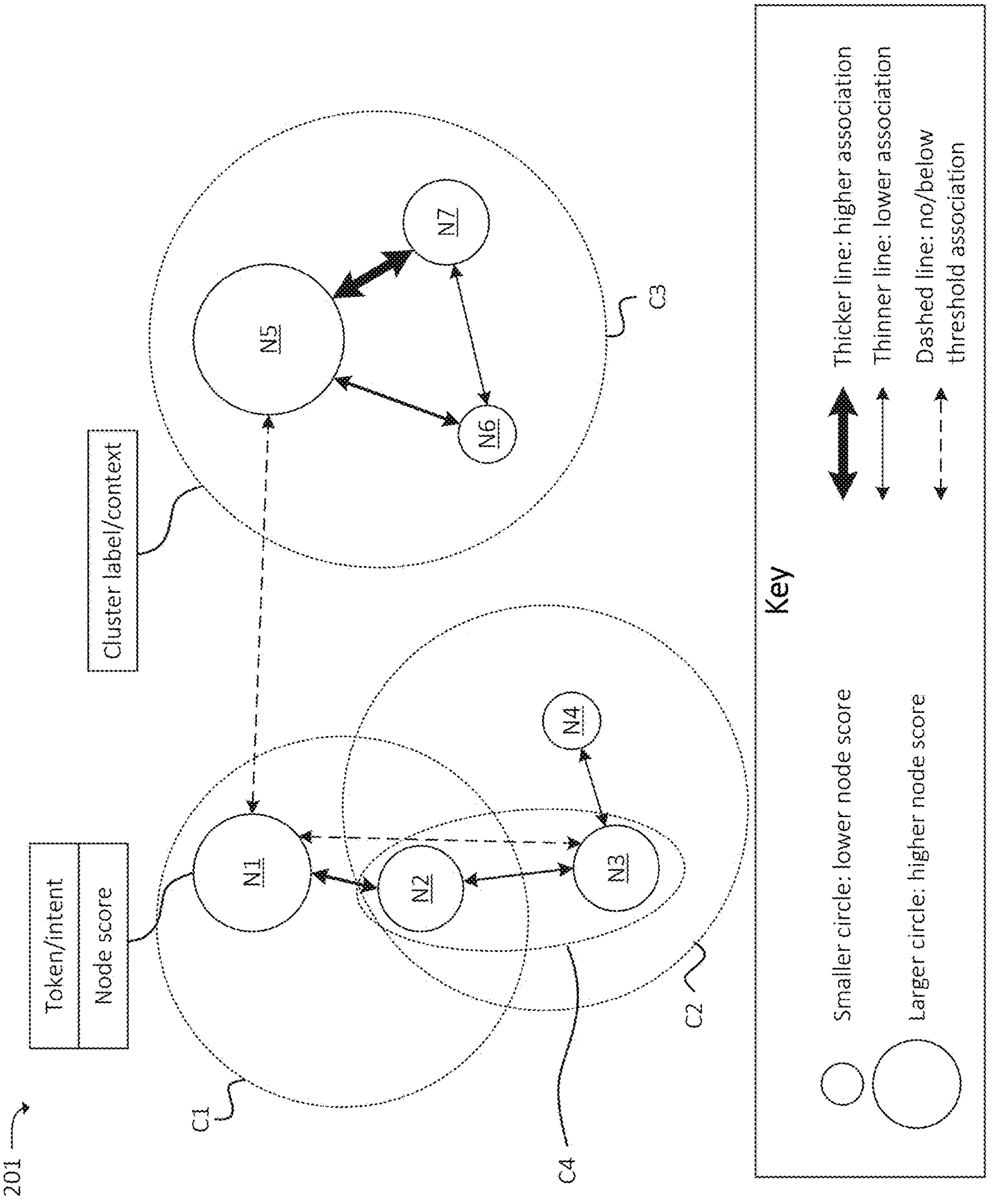
FIG. 2 illustrates an example dynamic semantic memory graph, in accordance with some embodiments.

FIG. 2 illustrates an example DSMG 201 of some embodiments. As shown, DSMG 201 may include a set of nodes (represented as nodes N1 through N7). As further shown, each node may be associated with one or more clusters (represented as clusters C1 through C4). In accordance with some embodiments, each node may be associated with a particular word, phrase, token, intent, or the like (referred to herein as "token or intent" for the sake of brevity). Each node may also be associated with a node score, which may be adjusted over time based on factors such as query term prevalence, feedback, a temporal decay mechanism, and/or other factors, as discussed below. For example, as shown, node N5 may be associated with a relatively high node score, while node N4 may be associated with a relatively low node score. In some embodiments, each node may be associated with multiple scores (e.g., a query term prevalence score, a feedback score, etc.), and/or may be associated with a single composite score that is based on multiple factors.

Additionally, DSMG 201 may indicate associations between respective nodes, which may be generally referred to as measures of relatedness between such nodes. For example, as shown, nodes N5 and N7 may have a relatively high association or measure of relatedness, nodes N6 and N7 may have a relatively lower association or measure of relatedness, and nodes N1 and N3 may have an even lower association or measure of relatedness (e.g., a "zero" measure of relatedness, or a measure of relatedness that is below a threshold measure of relatedness).

Each cluster may, in some embodiments, include multiple nodes, such as nodes that are associated with at least a threshold association (e.g., at least a threshold measure of relatedness). As discussed below, the measure of relatedness between two nodes may be based on multiple factors, such as the tokens or intents associated with the two nodes being received as part of the same query. In some embodiments, other factors based on which the measure of relatedness for two nodes is determined may include a measure of semantic similarity, a measure of topical similarity, and/or some other suitable factor or methodology.

As shown, a node may be associated with one or more clusters. In this example, cluster C1 includes nodes N1 and N2; cluster C2 includes nodes N2, N3, and N4; cluster C3 includes nodes N5, N6, and N7; and cluster C4 includes nodes N2 and N3. That is, in some scenarios, one node may be associated with a single cluster. On the other hand, in some scenarios, one node may be associated with multiple clusters. For example, node N1 is associated with only cluster C1, while node N2 is associated with clusters C1, C2, and C4.

Additionally, different nodes of a given cluster may have different relative measures of relatedness to each other. For example, nodes N5 and N7 of cluster C3 may have a relatively high measure of relatedness, while nodes N6 and N7 of cluster C3 may have a relatively lower measure of relatedness.

In some embodiments, generating or defining a particular cluster may include determining that at least a threshold quantity of nodes (e.g., pairs or sets of nodes) exhibit at least a threshold measure of similarity with each other, either on an individual basis or on an aggregate basis. For instance, in one implementation that is alternate to the example shown in FIG. 2, cluster C4 may not be generated based on the association between nodes N2 and N3 if the measure of relatedness between N2 and N3 does not exceed a threshold, and/or if the association between nodes N2 and N3 does not constitute a threshold quantity of related nodes. In such an example, node N2 would be a member of cluster C1 and C2, and node N3 would be a member of cluster C2.

Figure 3:
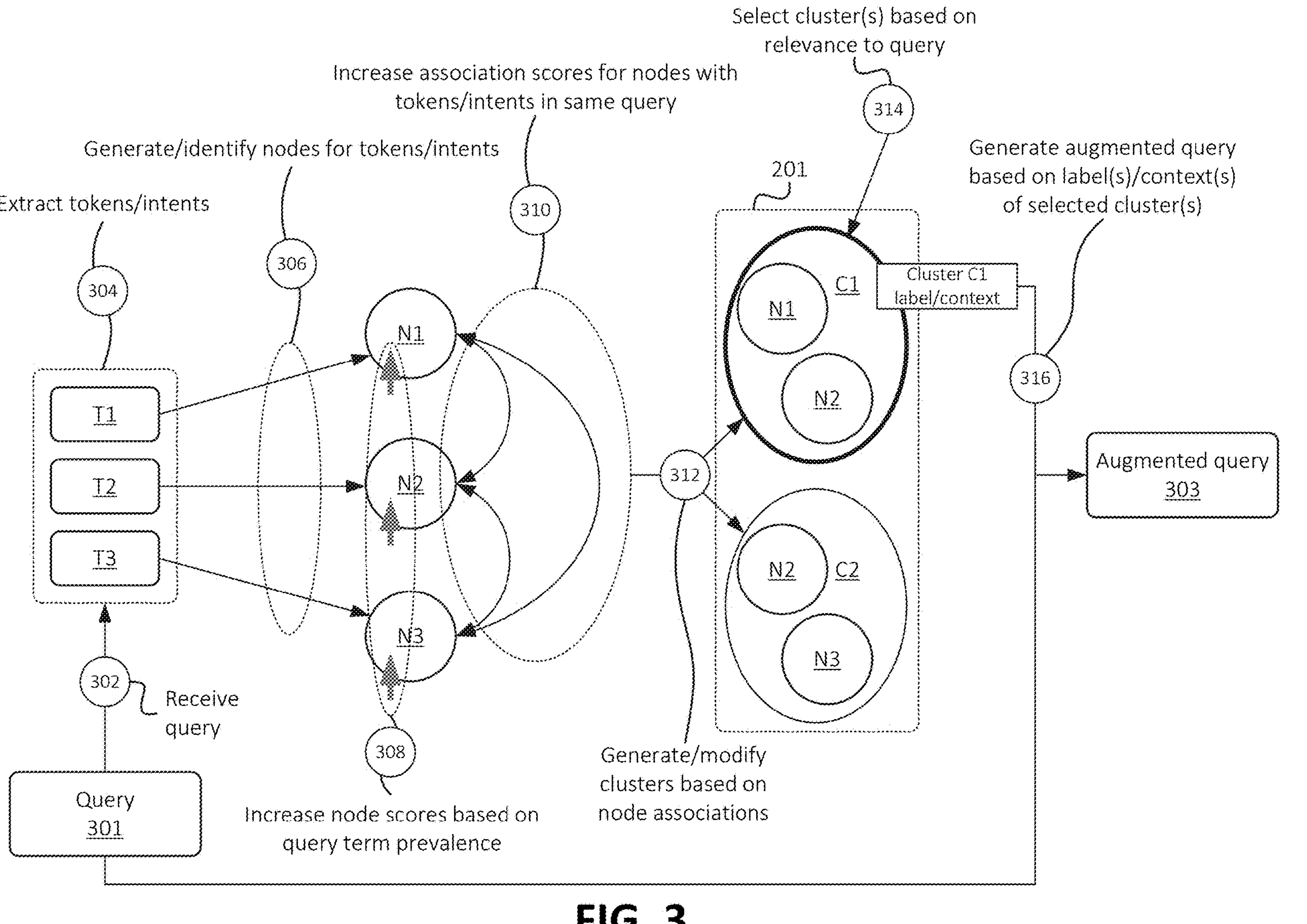
FIG. 3 illustrates an example of generating, refining, and utilizing a dynamic semantic memory graph based on one or more received queries, in accordance with some embodiments.

FIG. 3 illustrates example operations for generating or modifying (e.g., at 102) DSMG 201. These operations are described in the context of a single query. In practice, some or all of such operations may be performed in numerous (e.g., thousands, millions, or more) iterations in order to refine and tune DSMG 201, thus increasing its efficiency and accuracy.

As shown, DSMG System 101 may receive (at 302) query 301, such as a query submitted by a user of user device 103 or an application executing at user device 103, a simulated query generated using AI/ML techniques such as NLP techniques, and/or some other type of suitable query or input. DSMG System 101 may extract or otherwise determine (at 304) a set of tokens and/or intents from query 301. For example, DSMG System 101 may utilize NLP techniques or other suitable techniques to identify tokens and/or intents associated with query 301.

In some embodiments, for example, DSMG System 101 may parse words or phrases of query 301, sanitize and/or normalize query 301 (e.g., eliminate "stop" words or articles, remove excess whitespace, remove capitalization, correct spelling errors, etc.), and may extract or identify one or more tokens and/or intents (e.g., based on the sanitized and/or normalized query) from the query. As one example, assume query 301 includes the phrase, "Tell me about the New York Giants." The one or more tokens or intents for this query 301 may include one or more of "New York" as a first token or intent, "Giants" as a second token or intent, "New York Giants" as a third token or intent, "tell" as a fourth token or intent, and so on. As another example, a token or intent identified for query 301 may include an "explanation" intent, which may be derived or identified based on the phrase "Tell me about" in the query (e.g., a phrase indicating that an intent of requesting an explanation on a topic is included in query 301).

In the example of FIG. 3, three tokens and/or intents are extracted from (represented as tokens and/or intents T1, T2, and T3) query 301. DSMG System 101 may generate or identify (at 306) respective nodes that are associated with the extracted tokens and/or intents. For example, DSMG System 101 may identify previously created nodes that include or are associated with the same tokens and/or intents as tokens and/or intents T1, T2, and/or T3. DSMG System 101 may generate a new node in a scenario where there is no existing node that is associated with a given token and/or intent from query 301.

DSMG System 101 may increase or otherwise adjust (at 308) node scores associated with the identified or generated nodes, where such increase or adjustment reflects the query term prevalence of each token and/or intent with which such nodes are associated. For example, frequently queried terms may be associated with relatively high node scores (e.g., based on relatively high query term prevalence of such terms), whereas less frequently queried terms may be associated with relatively lower node scores (e.g., based on relatively lower query term prevalence of such terms).

DSMG System 101 may further increase or otherwise adjust (at 310) association scores for nodes with tokens and/or intents in the same query. For example, the association between node N1 and N2 may be increased based on node tokens and/or intents of N1 and N2 being present in the same query 301, the association between node N1 and N3 may be increased based on node tokens and/or intents of N1 and N3 being present in the same query 301, and the association between node N2 and N3 may be increased based on node tokens and/or intents of N2 and N3 being present in the same query 301.

As discussed above, the association scores between a pair or set of nodes may be based on one or more other factors in addition to or in lieu of the presence of associated tokens and/or intents being present in the same query. Such factors may include, for example, a measure of semantic similarity, a measure of topical similarity, and/or other suitable factors.

DSMG System 101 may further generate or modify (at 312) one or more clusters (e.g., clusters C1 and C2, in this example) based on the association scores (e.g., the adjusted association scores). For example, in a scenario where an association score between nodes N2 and N3 increases beyond a threshold based on the adjustment (at 310) of their respective association scores, DSMG System 101 may generate (at 312) cluster C2 that includes or is based on nodes N2 and N3 in response to determining that the association score between nodes N2 and N3 has increased beyond the threshold.

In some embodiments, modifying (at 312) the clusters may include generating or modifying a label, a context, a category, a classification, a description, etc. associated with the cluster. For example, in some embodiments, such label, context, etc. for a given cluster may include or may be based on one or more nodes included in the cluster. For example, DSMG System 101 may select a particular quantity of nodes (e.g., a particular quantity of highest scored nodes) of the cluster, and may generate the label, context, etc. for the cluster based on these selected nodes. In some embodiments, DSMG System 101 may utilize AI/ML techniques such as NLP techniques to generate such label, context, etc. Additionally, or alternatively, the label, context, etc. may be generated or adjusted by an administrator, operator, etc. associated with DSMG System 101.

In some embodiments, DSMG System 101 may determine one or more weights for each such node, based on the respective node scores. For example, a node with a relatively higher node score may be weighted more heavily in an automated procedure that generates a label, context, etc. for the cluster. On the other hand, a node with a relatively lower node score may be weighted less heavily in the automated procedure that generates the label, context, etc. for the cluster.

In this manner, DSMG System 101 may continue to refine or modify DSMG 201 based on incoming queries, such as query 301. Additionally, as discussed above, DSMG System 101 may utilize DSMG 201 in formulating an augmented query in order to output (e.g., at 108, as discussed above) such augmented query to an NLP system, such as LLM System 105, for generation of a response to query 301. For example, as further shown in FIG. 3, DSMG System 101 may select (at 314) one or more clusters that are based on a measure of relevance, similarity, or other similar attribute of such clusters to query 301. In one example implementation, DSMG System 101 may compare one or more tokens and/or intents of query 301 (e.g., tokens and/or intents T1, T2, and T3) to the tokens and/or intents of one or more nodes of one or more clusters. DSMG System 101 may, for example, determine a similarity score, a relevance score, etc. between query 301 and each cluster based on, for example, comparing the tokens and/or intents of query 301 to the tokens and/or intents of one or more nodes of one or more clusters.

In some embodiments, the node scores for the nodes of DSMG 201 may contribute to a weighting mechanism in the comparison of tokens and/or intents of query 301 to tokens and/or intents of the nodes of DSMG 201. For example, assume that a first token and/or intent of query 301 matches the token and/or intent of a first node of DSMG 201, and that a second token and/or intent of query 301 matches the token and/or intent of a second node of DSMG 201. Further assume that the first node is a relatively highly scored node, and that the second node is a relatively lower scored node. A relevance score between the first token and/or intent of query 301 and the first node may thus be relatively higher than a relevance score between the second token and/or intent of query 301 and the second node. For example, the higher weight of the first node may have a greater impact in the above-mentioned relevance score between the first node and the first token and/or intent.

In some embodiments, DSMG System 101 may select (at 314) a single cluster based on query 301. In some embodiments, DSMG System 201 may select multiple clusters based on query 301. For example, DSMG System 101 may select a particular quantity of clusters (e.g., a quantity of clusters with the highest relevance scores with respect to query 301), and/or may select clusters with at least a threshold relevance score with respect to query 301, and/or may otherwise select multiple clusters based on query 301.

DSMG System 101 may generate (at 316) augmented query 303 based on query 301 and further based on the selected cluster(s). For example, DSMG System 101 may add, concatenate, append, prepend, etc. label and/or context information associated with the selected cluster(s) with the original query 301. In situations where multiple clusters are selected, augmented query 303 may include the label and/or context information of each selected cluster, may include a label and/or context that is derived from combining or aggregating the label and/or context information of each selected cluster, and/or may have some other suitable information that is based on the label and/or context information of one or more of the selected clusters. As discussed above, augmented query 303 may be provided to LLM System 105, which may generate a response to augmented query 303, where such response may be more accurate, focused, and complete as compared to a response that would be generated based on query 301 alone.

Figure 4:
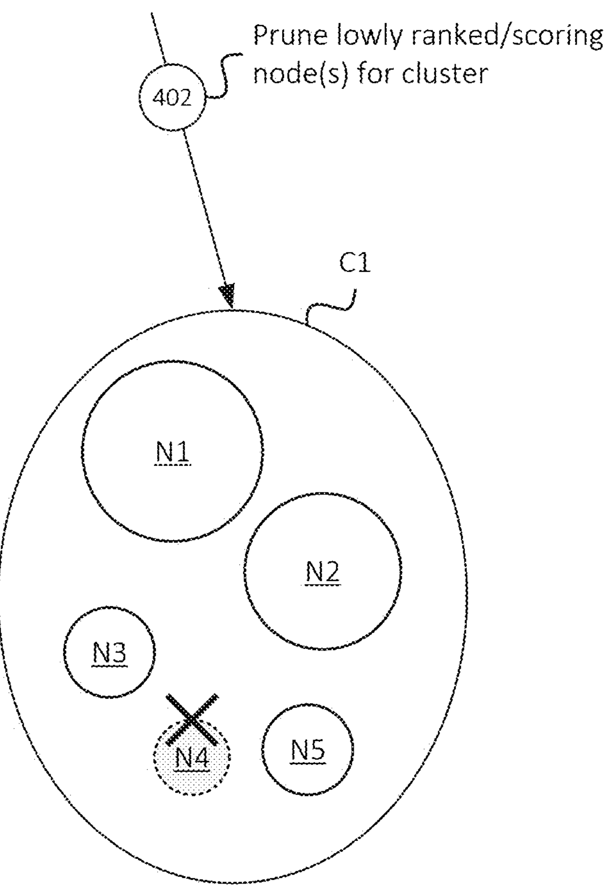
FIG. 4 illustrates an example of pruning a dynamic semantic memory graph, in accordance with some embodiments.

As discussed above, refining DSMG 201 may include performing one or more additional operations, such as increasing or decreasing node scores based on feedback (e.g., user feedback) received after providing responses to augmented queries, such as augmented query 303. Additionally, as shown in FIG. 4, refining DSMG 201 may include a temporal decay mechanism and/or pruning mechanism, in which the node scores for some or all nodes of DSMG 201 may decay, decrease, decline, etc. as a function of time. In some examples, the decay mechanism may operate on a linear basis, a logarithmic basis, an exponential basis, and/or according to some other suitable function. In some embodiments, other mechanisms may be employed in the temporal decay mechanism, such as a temporal pausing of the decay or a resetting of the temporal decay function based on events such as the detection of a particular token and/or intent, associated with a given node, in a received query or response.

In some embodiments, DSMG System 101 may prune (at 402) lowly ranked and/or scored nodes. For example, DSMG System 101 may identify nodes for which a score is (or has fallen below) a threshold node score. In some embodiments, DSMG System 101 may identify the lowest scoring nodes of a given cluster, and may prune the lowest scoring nodes of the cluster. In this manner, different clusters may have different node score thresholds based on which nodes would be pruned. Pruning a node may include removing the node from DSMG 201, which may reduce the amount of memory required to store or implement DSMG 201, thus enhancing the efficiency of a device (e.g., a computer, a server device or collection of server devices, a cloud-based system, etc.) that implements DSMG 201 (e.g., in order to generate augmented queries that increase the accuracy and completeness of query responses generated using NLP techniques).

Figure 5:
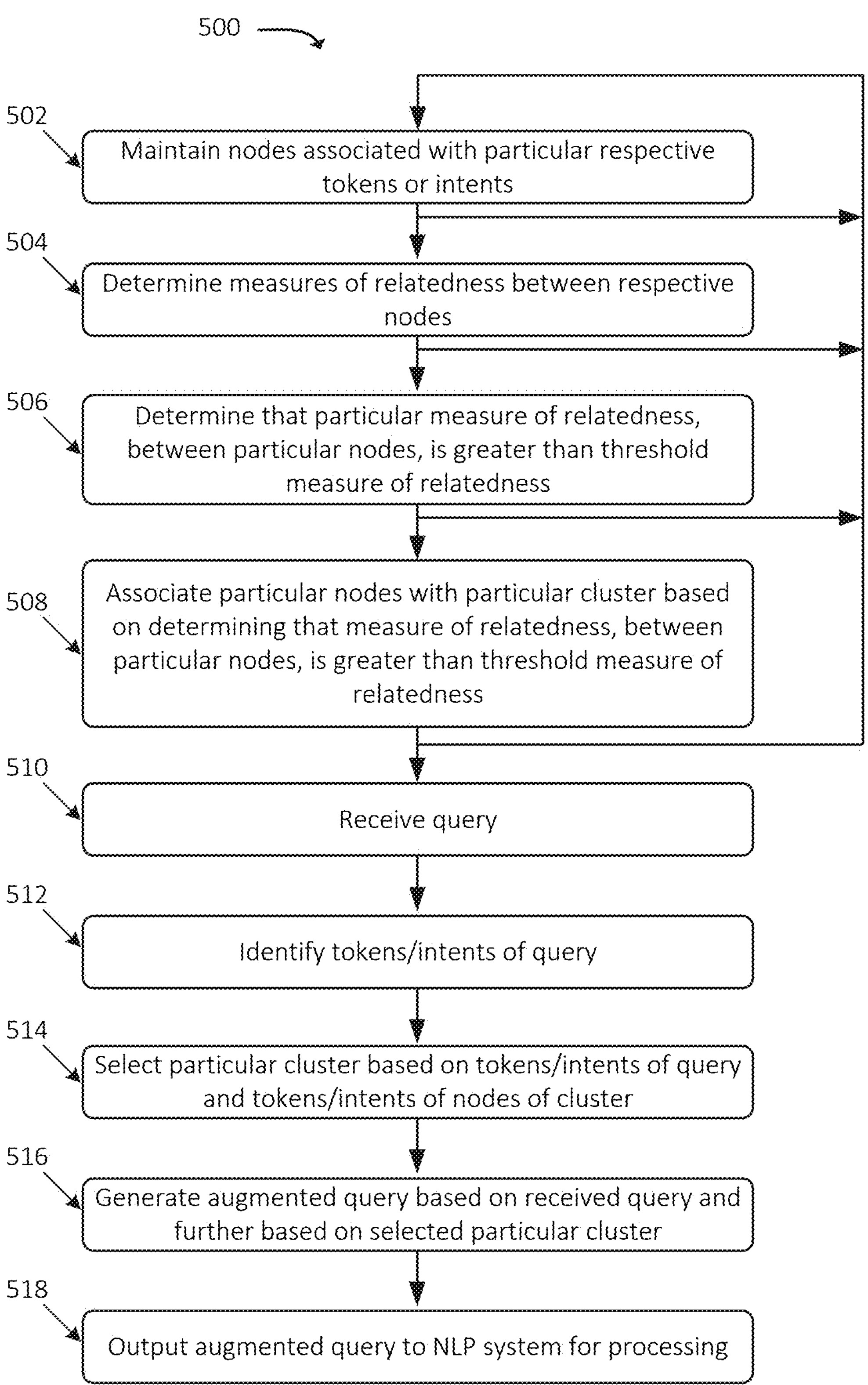
FIG. 5 illustrates an example process for generating, refining, and utilizing a dynamic semantic memory graph based on one or more received queries, in accordance with some embodiments.

FIG. 5 illustrates an example process 500 for generating, refining, and utilizing a dynamic semantic memory graph based on one or more received queries. In some embodiments, some or all of process 500 may be performed by DSMG System 101. In some embodiments, one or more other devices may perform some or all of process 500 in concert with, and/or in lieu of, DSMG System 101.

As shown, process 500 may include maintaining (at 502) nodes associated with particular respective tokens or intents. For example, as discussed above, DSMG System 101 may generate, refine, etc. nodes of DSMG 201 based on received queries over time, which may include user-submitted queries, programmatically generated queries or inputs, simulated queries or inputs, or the like. As also discussed above, maintaining DSMG 201 may further include performing temporal decay mechanisms, feedback-based scoring mechanisms, query term prevalence determination, and/or other suitable operations to adjust information associated with nodes (e.g., node scores) over time.

Process 500 may further include determining (at 504) measures of relatedness between respective nodes. For example, as discussed above, DSMG System 101 may determine the measures of relatedness based on tokens and/or intents associated with particular nodes, such as based on a measure of semantic relatedness between such tokens and/or intents, a measure of topical similarity between such tokens and/or intents, whether such tokens and/or intents were present in the same query or queries, and/or other suitable factors.

Process 500 may additionally include determining (at 506) that a particular measure of relatedness, between particular nodes, is greater than a threshold measure of relatedness. Process 500 may also include associating (at 508) particular nodes with a particular cluster based on determining that the measure of relatedness, between particular nodes, is greater than the threshold measure of relatedness. For example, as discussed above, nodes that are associated with at least a threshold measure of relatedness may be grouped, categorized, and/or otherwise included in the same cluster. As discussed above, each cluster may be associated with label and/or context information, which may be derived from tokens and/or intents of nodes of the cluster and/or based on other information.

Process 500 may further include receiving (at 510) a query. For example, DSMG System 101 may receive a query from a user or user device 103, and may identify (at 512) tokens and/or intents of the query. For example, DSMG System 101 may utilize NLP techniques or other suitable techniques to identify the tokens and/or intents of the query.

Process 500 may also include selecting (at 514) a particular cluster based on tokens/intents of the query and tokens/intents of nodes of the cluster. For example, DSMG System 101 may compare the tokens and/or intents of the query to tokens/intents of nodes of one or more clusters, and may select one or more clusters based on such comparing. For example, a particular cluster with nodes that are associated with tokens and/or intents that are the most similar or otherwise highest relevance to the tokens and/or intents of the query may be selected. In some embodiments, as discussed above, multiple clusters may be selected in this manner (e.g., multiple ones of the clusters with nodes exhibiting the highest relevance to the tokens and/or intents of the query).

Process 500 may further include generating (at 516) an augmented query based on the received query and further based on the selected particular cluster. For example, as discussed above, DSMG System 101 may add, combine, etc. some or all of the label and/or context information of the selected cluster (or clusters) to the original query, and may output (at 518) the augmented query to an NLP system (e.g., LLM System 105) for processing. As discussed above, the NLP system may be able to provide more focused, relevant responses when given the additional context. Further, since nodes of DSMG 201 are continuously maintained or pruned based on factors such as query term prevalence, temporal decay, and feedback, relevant nodes (and their associated context information) may be kept in memory potentially longer than in implementations in which older or "stale" context information is flushed or pruned purely on a temporal basis.

Figure 6:
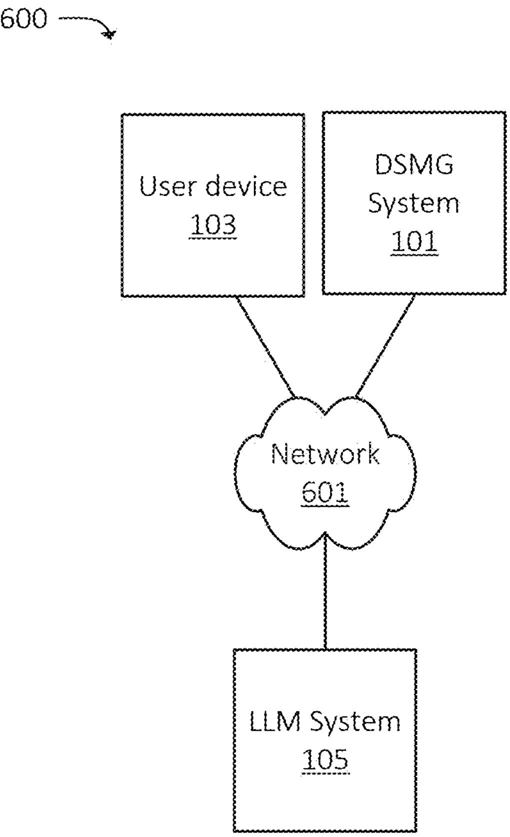
FIG. 6 illustrates an example environment in which one or more embodiments, described herein, may be implemented.

FIG. 6 illustrates an example environment 600, in which one or more embodiments may be implemented. Environment 600 may include network 601, DSMG System 101, user device 103, and LLM System 105. In some embodiments, environment 600 may include one or more additional devices or systems communicatively coupled to network 601 and/or one or more other networks.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600. Elements of environment 600 may interconnect with each other and/or other devices via wired connections, wireless connections, or a combination of wired and wireless connections. Some or all of the elements of environment 600 may be implemented by one or more devices, sets of hardware resources, cloud systems, or the like.

Network 601 may include one or more wired and/or wireless networks. For example, network 601 may include an IP-based Packet Data Network ("PDN"), a wide area network ("WAN") such as the Internet, a private enterprise network, and/or one or more other networks. DSMG System 101, user device 103, and LLM System 105, and/or other devices or systems may communicate, through network 601, with each other and/or with other devices that are coupled to network 601. Network 601 may be connected to one or more other networks, such as a public switched telephone network ("PSTN"), a public land mobile network ("PLMN"), and/or another network. Network 601 may be connected to one or more devices, such as content providers, applications, web servers, and/or other devices, with which DSMG System 101, user device 103, and LLM System 105, and/or other devices or systems may communicate.

DSMG System 101, user device 103, and LLM System 105, and/or other devices or systems may be implemented by one or more cloud systems, server devices, or other types of hardware resources. In some embodiments, DSMG System 101, user device 103, and/or LLM System 105 may be implemented by or communicatively coupled to a User Equipment ("UE"), which may include a computation and communication device, such as a wireless mobile communication device that is capable of communicating with network 601. The UE may communicate with network 601 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 7:
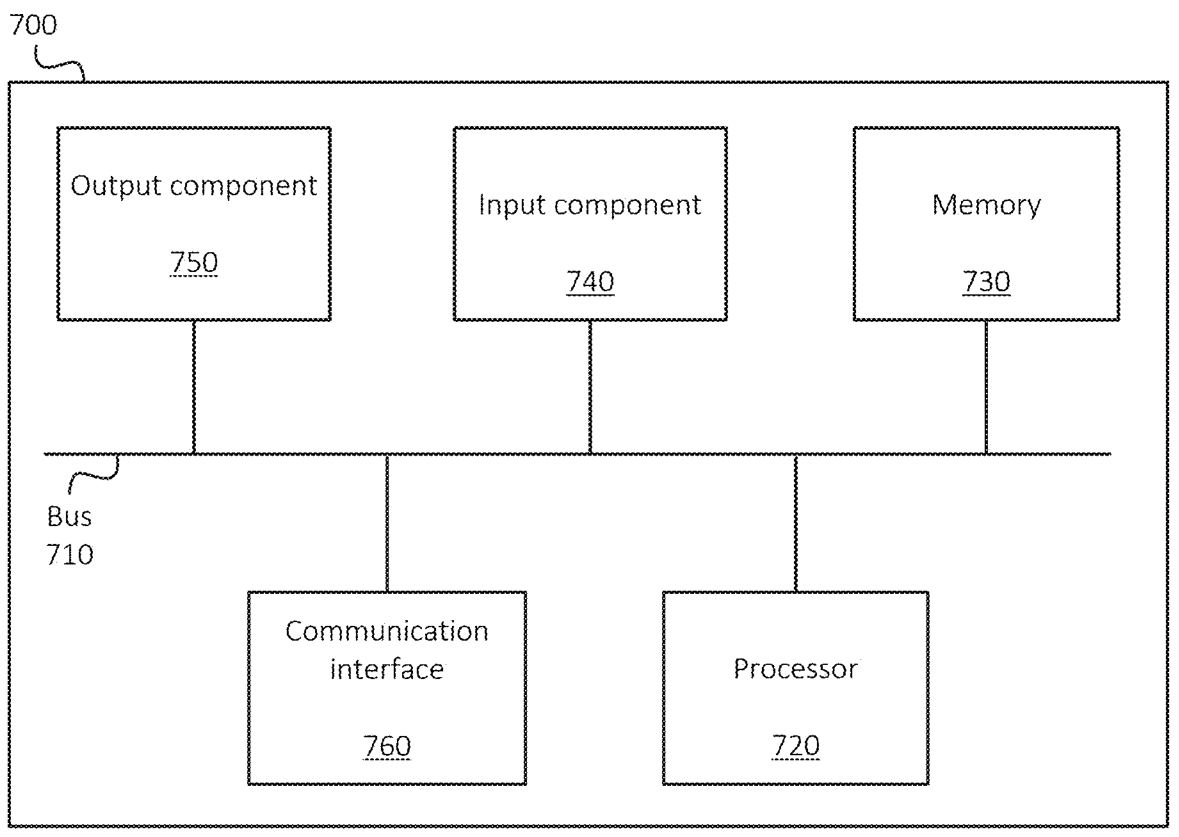
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, a set of provisioned hardware resources of a cloud computing system, a graphics processing unit ("GPU"), a GPU-based processing unit, a neural processing unit ("NPU"), or other suitable type of hardware that interprets and/or executes instructions (e.g., processor-executable instructions). In some embodiments, processor 720 may be or may include one or more hardware processors. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or otherwise receives or detects input from a source external to input component 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems (e.g., via RAN $a10, RAN $a12, DN $a50, etc.). For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 700 may include more than one communication interface 760. For instance, device 700 may include an optical interface, a wireless interface, an Ethernet interface, and/or one or more other interfaces.

Device 700 may perform certain operations relating to one or more processes described above. Device 700 may perform these operations in response to processor 720 executing instructions, such as software instructions, processor-executable instructions, etc. stored in a computer-readable medium, such as memory 730. A computer-readable medium may be defined as a non-transitory memory device. A memory device may include space within a single physical memory device or spread across multiple physical memory devices. The instructions may be read into memory 730 from another computer-readable medium or from another device. The instructions stored in memory 730 may be processor-executable instructions that cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set. Concepts described above may be embodied by, for example, a device, devices, a system, systems, a method, methods, a non-transitory computer-readable medium, and/or non-transitory computer-readable media, as provided for in the claims.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

identify a plurality of tokens or intents associated with a plurality of queries;

maintain a plurality of nodes that are each associated with a particular respective token or intent of the plurality of tokens or intents;

identify that a particular query, of the plurality of queries, includes a first token or intent and a second token or intent, wherein a first node of the plurality of nodes is associated with the first token or intent and wherein a second node of the plurality of nodes is associated with the second token or intent;

determine a particular measure of relatedness between the first and second nodes based on identifying that the first token or intent and the second token or intent are present in the same particular query;

determine that the particular measure of relatedness, between the first and second nodes, is greater than a threshold measure of relatedness;

associate the first and second nodes with a particular cluster, based on determining that the particular measure of relatedness between the two particular nodes is greater than the threshold measure of relatedness, wherein the particular cluster further includes a third node that is associated with a third token or intent of the plurality of tokens or intents, wherein the particular cluster is associated with particular context information that is based on the third node;

receive a query;

identify a particular set of tokens or intents associated with the received query;

identify, based on the particular set of tokens or intents associated with the received query, that the query is associated with the particular cluster;

generate an augmented query based on the received query and further based on the particular context information that is based on the third node associated with the particular cluster; and output the augmented query to a Natural Language Processing ("NLP") system that generates a response based on the augmented query.

2. The device of claim 1, wherein the one or more processors are further configured to:

provide the response to a device or system from which the query was received.

3. The device of claim 1, wherein the NLP system implements one or more large language models ("LLMs") to generate the response based on the augmented query.

4. The device of claim 1, wherein the query includes a first set of words or phrases, and wherein the particular context information includes a second set of words or phrases, wherein the augmented query includes the first set of words or phrases and the second set of words or phrases.

5. The device of claim 1, wherein the one or more processors are further configured to:

maintain a node score for each node of the plurality of nodes;

identify that the received query includes the first token or intent with which the first node is associated; and adjust a particular node score for the first node based on identifying that the received query includes the first token or intent with which the first node is associated.

6. The device of claim 5, wherein the one or more processors are further configured to:

determine a weight for each node of the plurality of nodes based on the respective node score for each node, wherein identifying that the query is associated with the particular cluster is further based on the respective weight for each node of the particular cluster.

7. The device of claim 5, wherein the one or more processors are further configured to:

decrease the node score for each node of the plurality of nodes as a function of time; and remove one or more nodes from the plurality of nodes when the respective node scores, for the one or more nodes, fall below a threshold node score based on the decreasing.

8. A non-transitory computer-readable medium, storing a plurality of processor-executable instructions to:

identify a plurality of tokens or intents associated with a plurality of queries;

maintain a plurality of nodes that are each associated with a particular respective token or intent of the plurality of tokens or intents;

identify that a particular query, of the plurality of queries, includes a first token or intent and a second token or intent, wherein a first node of the plurality of nodes is associated with the first token or intent and wherein a second node of the plurality of nodes is associated with the second token or intent;

determine a particular measure of relatedness between the first and second nodes based on identifying that the first token or intent and the second token or intent are present in the same particular query;

determine that the particular measure of relatedness, between the first and second nodes, is greater than a threshold measure of relatedness;

associate the first and second nodes with a particular cluster, based on determining that the particular measure of relatedness between the two particular nodes is greater than the threshold measure of relatedness, wherein the particular cluster further includes a third node that is associated with a third token or intent of the plurality of tokens or intents, wherein the particular cluster is associated with particular context information that is based on the third node;

receive a query;

identify a particular set of tokens or intents associated with the received query;

identify, based on the particular set of tokens or intents associated with the received query, that the query is associated with the particular cluster;

generate an augmented query based on the received query and further based on the particular context information that is based on the third node associated with the particular cluster; and output the augmented query to a Natural Language Processing ("NLP") system that generates a response based on the augmented query.

9. The non-transitory computer-readable medium of claim 8, wherein the plurality of processor-executable instructions further include processor-executable instructions to:

provide the response to a device or system from which the query was received.

10. The non-transitory computer-readable medium of claim 8, wherein the NLP system implements one or more large language models ("LLMs") to generate the response based on the augmented query.

11. The non-transitory computer-readable medium of claim 8, wherein the query includes a first set of words or phrases, and wherein the particular context information includes a second set of words or phrases, wherein the augmented query includes the first set of words or phrases and the second set of words or phrases.

12. The non-transitory computer-readable medium of claim 8, wherein the plurality of processor-executable instructions further include processor-executable instructions to:

maintain a node score for each node of the plurality of nodes;

identify that the received query includes the first token or intent with which the first node is associated; and adjust a particular node score for the first node based on identifying that the received query includes the first token or intent with which the first node is associated.

13. The non-transitory computer-readable medium of claim 12, wherein the plurality of processor-executable instructions further include processor-executable instructions to:

determine a weight for each node of the plurality of nodes based on the respective node score for each node, wherein identifying that the query is associated with the particular cluster is further based on the respective weight for each node of the particular cluster.

14. The non-transitory computer-readable medium of claim 12, wherein the plurality of processor-executable instructions further include processor-executable instructions to:

decrease the node score for each node of the plurality of nodes as a function of time; and remove one or more nodes from the plurality of nodes when the respective node scores, for the one or more nodes, fall below a threshold node score based on the decreasing.

15. A method, comprising:

identifying a plurality of tokens or intents associated with a plurality of queries;

maintaining a plurality of nodes that are each associated with a particular respective token or intent of the plurality of tokens or intents;

identifying that a particular query, of the plurality of queries, includes a first token or intent and a second token or intent, wherein a first node of the plurality of nodes is associated with the first token or intent and wherein a second node of the plurality of nodes is associated with the second token or intent;

determining a particular measure of relatedness between the first and second nodes based on identifying that the first token or intent and the second token or intent are present in the same particular query;

determining that the particular measure of relatedness, between the first and second nodes, is greater than a threshold measure of relatedness;

associating the first and second nodes with a particular cluster, based on determining that the particular measure of relatedness between the two particular nodes is greater than the threshold measure of relatedness, wherein the particular cluster further includes a third node that is associated with a third token or intent of the plurality of tokens or intents, wherein the particular cluster is associated with particular context information that is based on the third node;

receiving a query;

identifying a particular set of tokens or intents associated with the received query;

identifying, based on the particular set of tokens or intents associated with the received query, that the query is associated with the particular cluster;

generating an augmented query based on the received query and further based on the particular context information that is based on the third node associated with the particular cluster; and outputting the augmented query to a Natural Language Processing ("NLP") system that generates a response based on the augmented query.

16. The method of claim 15, further comprising:

providing the response to a device or system from which the query was received.

17. The method of claim 15, wherein the query includes a first set of words or phrases, and wherein the particular context information includes a second set of words or phrases, wherein the augmented query includes the first set of words or phrases and the second set of words or phrases.

18. The method of claim 15, further comprising:

maintaining a node score for each node of the plurality of nodes;

identifying that the received query includes the first token or intent with which the first node is associated; and adjusting a particular node score for the first node based on identifying that the received query includes the first token or intent with which the first node is associated.

19. The method of claim 18, further comprising:

determining a weight for each node of the plurality of nodes based on the respective node score for each node, wherein identifying that the query is associated with the particular cluster is further based on the respective weight for each node of the particular cluster.

20. The method of claim 18, further comprising:

decreasing the node score for each node of the plurality of nodes as a function of time; and removing one or more nodes from the plurality of nodes when the respective node scores, for the one or more nodes, fall below a threshold node score based on the decreasing.

* * * * *